(12) United States Patent
Xu

(10) Patent No.: US 11,194,237 B2
(45) Date of Patent: Dec. 7, 2021

(54) PROJECTOR

(71) Applicant: Yi Xu, Sichuan (CN)

(72) Inventor: Yi Xu, Sichuan (CN)

(73) Assignee: Xingguangpu Technology Chengdu Co., Ltd., Sichuan (CN)

(*) Notice: Subject to any disclaimer, the term of this patent is extended or adjusted under 35 U.S.C. 154(b) by 225 days.

(21) Appl. No.: 16/198,749

(22) Filed: Nov. 21, 2018

(65) Prior Publication Data

US 2020/0096848 A1 Mar. 26, 2020

(30) Foreign Application Priority Data

Sep. 26, 2018 (CN) .......................... 201811123626.6

(51) Int. Cl.
| | | |
|---|---|---|
| G03B 21/16 | (2006.01) | |
| G02B 27/30 | (2006.01) | |
| G03B 21/00 | (2006.01) | |
| G03B 21/20 | (2006.01) | |
| G02B 27/28 | (2006.01) | |

(52) U.S. Cl.
CPC .......... *G03B 21/16* (2013.01); *G02B 27/285* (2013.01); *G02B 27/286* (2013.01); *G02B 27/30* (2013.01); *G03B 21/006* (2013.01); *G03B 21/2033* (2013.01); *G03B 21/2073* (2013.01)

(58) Field of Classification Search
None
See application file for complete search history.

(56) References Cited

U.S. PATENT DOCUMENTS

| | | | | |
|---|---|---|---|---|
| 2008/0067696 | A1* | 3/2008 | Goth ...................... | H01L 23/26 257/777 |
| 2010/0066980 | A1* | 3/2010 | Tsuchiya ................ | G03B 21/16 353/56 |
| 2011/0242499 | A1* | 10/2011 | Terao .................... | H04N 9/3144 353/57 |
| 2012/0055170 | A1* | 3/2012 | Lilke .................... | F24H 3/0411 62/3.3 |
| 2017/0214892 | A1* | 7/2017 | Nagatani .............. | H04N 9/3155 |
| 2018/0299673 | A1* | 10/2018 | Brick ................. | G02B 27/0977 |

* cited by examiner

*Primary Examiner* — Toan Ton
*Assistant Examiner* — Danell L Owens

(57) ABSTRACT

The invention discloses a novel projector, comprising a sealed shell of electronic projector, an illumination system and a LED light source system, wherein the sealed shell is provided with an optical and internal circulation cooling assembly inside by area; the optical assembly comprises the projector working assembly. The invention is inside a sealed shell; the cold air far below normal temperature generated by semiconductor refrigeration piece takes away the heat on optical device, improving the heat dissipation efficiency. Simultaneously, because the cold air is inside a sealed shell, the optical device can be placed in a dust-free environment. The polarized light conversion prism converts the useless P light in conventional projector imagining into the useful S light, improving the light utilization, and increasing the brightness of projection at the same power. The LED light source is collimated by the collimating lens to meet PCS conversion requirement for polarized light converter.

3 Claims, 12 Drawing Sheets

PROJECTOR

BACKGROUND OF THE INVENTION

1. Field of the Invention

The invention relates to the field of projector and in particular, to a novel projector.

2. Description of the Related Art

A projector is an optical instrument that uses optical elements to magnify a display screen and project it onto a screen, and it is widely used in the field of large-sized display.

However, when the projector is in use, the optical device generates a large amount of heat, which seriously affects the life of the projector and the stationarity of use. The projector needs to be cooled down from the outside air with a fan when in use, which causes the problem of dirty and black spots inside the system after being used for a period of time and affects the display effect. The light emitted from the light source of the conventional projector comprises P light and S light, but the projector can only utilize one of them, which results in low overall light efficiency.

Moreover, as a display device, a projector with low cost and excellent effect is also indispensable.

SUMMARY OF THE INVENTION

The technical problem to be solved by the invention is to provide a novel projector, adopting a sealed internal circulation refrigeration system, a lens with low cost and excellent effect, a polarized light conversion prism and a collimating light source structure, which can effectively solve many shortcomings in the prior art.

The invention is realized through the following technical scheme: a novel projector, comprising a sealed shell of electronic projector, an illumination system and a light source system, wherein the sealed shell is provided with an optical assembly and an internal circulation cooling assembly inside by area;

the internal circulation cooling assembly is disposed in a first mounting area of the sealed shell, and the projector lens and other optical working assemblies are disposed in a second mounting area of the sealed shell; two mounting areas are distributed in left and right and are electrically connected to each other, and the internal circulation cooling assembly forms a sealed cooling circulation airflow path inside the sealed shell with the projector optical working assembly.

As a preferable technical scheme, the internal circulation cooling assembly comprises a first fan, a heat conducting slug, a semiconductor refrigeration piece, a cooling conducting slug and a second fan; the heat conducting slug is mounted on the heat generating surface of the semiconductor refrigeration piece, and the first fan is mounted on the side of the heat conducting slug and dissipates the heat generated by the semiconductor refrigeration piece; the cooling conducting slug is mounted on the refrigeration surface of the semiconductor refrigeration piece, the air inlet of the second fan is disposed near the cooling conducting slug; the cold air generated by the cooling conducting end is blown along the air duct to the optical assembly by the second fan; more than one cooling circulation airflow paths are disposed at the air outlet of the second fan.

As a preferable technical scheme, the projector further comprises a vapor absorption filler and the vapor absorption filler is disposed at one side of the cooling conducting slug to absorb the moisture from the cold air.

As a preferable technical scheme, the vapor absorption filler adopts the desiccant.

As a preferable technical scheme, the outer side of the first fan is provided with more than one air inlet and outlet holes, and the inlet and outlet holes are open to the outside atmosphere.

As a preferable technical scheme, the projector working assembly comprises a lens, a mirror, a front Fresnel lens, a LCD screen, a heat insulating piece and a rear Fresnel lens; the mirror is disposed in an inclined structure at the middle of the entire sealed shell; the front Fresnel lens is disposed at the end near the mirror, and the outer side of the front Fresnel lens are the LCD screen, the heat insulating piece and the rear Fresnel lens; the lens is disposed at the side of the sealed shell and is against the mirror of the inner side thereof; a cooling circulation airflow path is formed between the front Fresnel lens, the LCD screen, the heat insulating piece and the rear Fresnel lens; the upper and lower portion of the mirror are open to be connected to the second mounting area.

As a preferable technical scheme, the lens can be the lens including but not limited to the following structure:

lens 1 structure:

the radius of curvature of the first piece of glass 47 is 52.6921 mm and −866.592 mm, and the glass material grade is CDGM H-ZK11;

the centre point spacing of the first piece of glass 47 and the second piece of glass 48 is 12.35 mm;

the radius of curvature of the second piece of glass 48 is −91.881 mm and −55.051 mm, and the glass material grade is CDGM H-ZF2;

the centre point spacing of the second piece of glass 48 and the third piece of glass 49 is 12.21 mm;

the radius of curvature of the third piece of glass 49 is 175.873 mm and 64.765 mm, and the glass material grade is CDGM H-ZK11;

lens 2 structure:

the radius of curvature of the first piece of glass 50 is 78.297 mm and −1604.5 mm, and the glass material grade is CDGM H-ZK11;

the centre point spacing of the first piece of glass 50 and the second piece of glass 51 is 23.5 mm;

the radius of curvature of the second piece of glass 51 is −121.834 mm and −79.915 mm, and the glass material grade is CDGM H-F4;

the centre point spacing of the second piece of glass 51 and the third piece of glass 52 is 19.65 mm;

the radius of curvature of the third piece of glass 52 is 296.048 mm and 96.406 mm, and the glass material grade is CDGM H-ZK11;

lens 3 structure the radius of curvature of the first piece of glass 53 is 74.71 mm and −32.72 mm, and the glass material grade is CDGM H-K9L;

the centre point spacing of the first piece of glass 53 and the second piece of glass 54 is 6.07 mm;

the radius of curvature of the second piece of glass 54 is 51.997 mm and −103.2 mm, and the glass material grade is CDGM H-ZF2;

the centre point spacing of the second piece of glass 54 and the third piece of glass 55 is 16.6 mm;

the radius of curvature of the third piece of glass 55 is 85.526 mm and 128.03 mm, and the glass material grade is CDGM H-ZK11;

the centre point spacing of the third piece of glass 55 and the fourth piece of glass 56 is 8.05 mm;

the radius of curvature of the fourth piece of glass 56 is −61.557 mm and −111.198 mm, and the glass material grade is CDGM H-ZF2;

the centre point spacing of the fourth piece of glass 56 and the fifth piece of glass 57 is 4.61 mm;

the radius of curvature of the fifth piece of glass 57 is −99.278 mm and 39.529 mm, and the glass material grade is CDGM H-ZK11;

the centre point spacing of the fifth piece of glass 57 and the sixth piece of glass 58 is 0.15 mm;

the radius of curvature of the sixth piece of glass 58 is −467.584 mm and 83.106 mm, and the glass material grade is CDGM H-ZK11.

As a preferable technical scheme, the illumination system comprises an expender lens and a polarized light conversion prism, the light source assembly comprises the collimating lens array, the LED array, the radiator and a third fan; the light source is disposed at the input of the polarized light conversion prism, and the expender lens is disposed at the output of the polarized light conversion prism; the diverging lights emitted from the light source become parallel lights through the collimating lens array; after the parallel lights pass through the polarized light conversion prism, the mixed light of P light and S light emitted from the LED becomes the pure S light; the left of the light conversion prism is provided with a expender lens, and the expender lens diverges the parallel lights after the prism conversion into a beam of taper light; the expender lens is disposed at the outer side of the rear Fresnel lens, and the light-exiting surface thereof is directly opposed to the light-entering surface of the rear Fresnel lens; the light irradiates on the LCD screen after being collimated by the Fresnel lens.

As a preferable technical scheme, the polarized light conversion prism comprises the mirror, a half wave piece and a PBS sheet, and the half wave piece is disposed at the output of the mirror.

The advantageous effects of the invention are as follows:

1. The invention is inside a sealed shell; the cold air far below normal temperature generated by the semiconductor refrigeration piece takes away the heat on the optical device, which improves the heat dissipation efficiency. Simultaneously, for that the cold air is inside a sealed shell, the optical device can be placed in a dust-free environment, which solves the problem of dirty and black spots for the conventional projector after being used for a period of time;

2. converting the useless P light in the conventional projector imagining into the useful S light, improves the light utilization, and greatly increases the brightness of the projection at the same power;

3. the cost of lens is low and the effect is excellent.

BRIEF DESCRIPTION OF THE DRAWINGS

In order to illustrate the technical solution of the invention or the prior art more clearly, the drawings used in the embodiments or the description of the prior art will be briefly introduced hereinafter. It is obvious that the drawings hereinafter are just some of the embodiments of the invention. Those of ordinary skill in the art can obtain other drawings according to these drawings without creative efforts.

DETAILED DESCRIPTION OF THE PREFERRED EMBODIMENTS

All of the features or steps in all methods or processes disclosed in the specification may be combined in any manner other than mutually exclusive features and/or steps.

Any feature disclosed in the specification (including any appended claims, abstract and drawings) may be replaced by other equivalents or alternatives, unless otherwise stated. That is, unless specifically stated, each feature is only one example of a series of equivalent or similar features.

Figure 1:
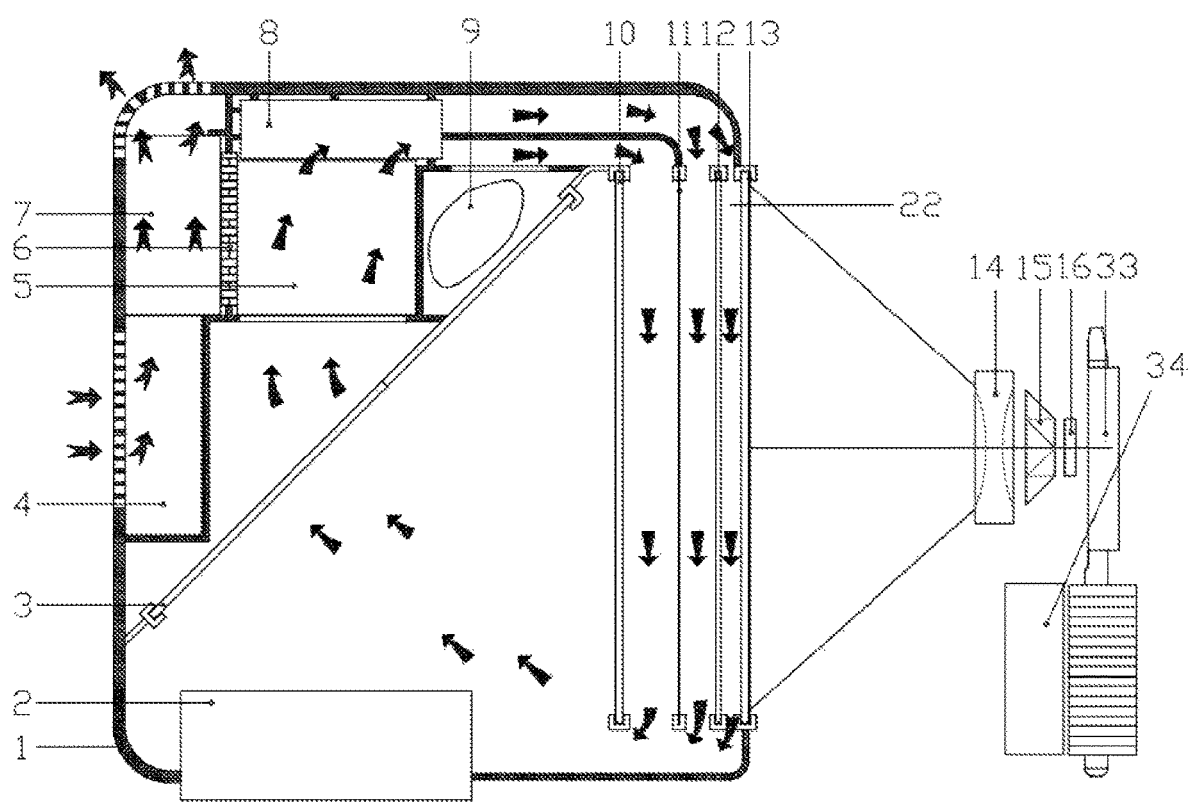
FIG. 1 is the diagram illustrating the overall working principle of the invention.
Figure 2:
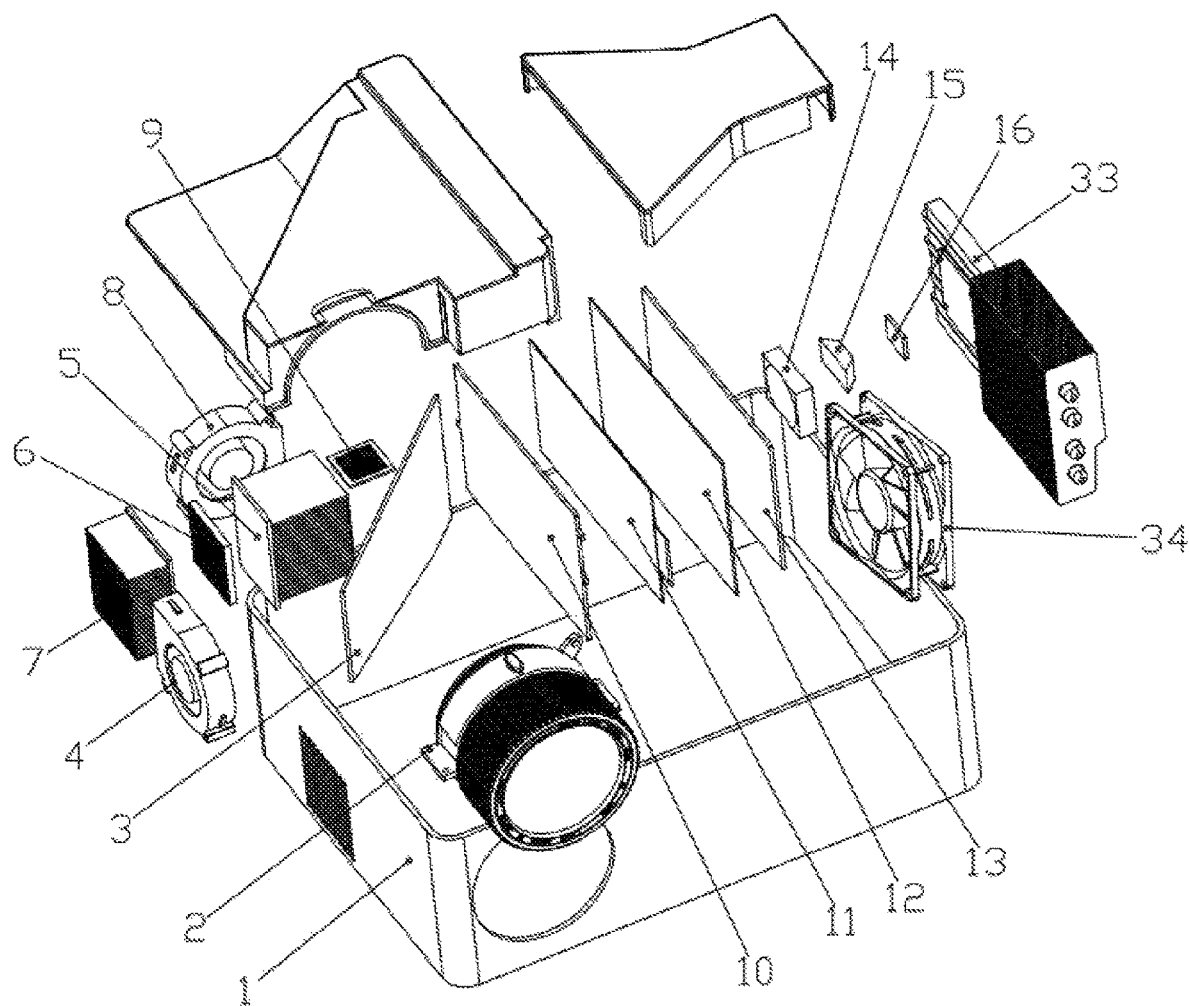
FIG. 2 is the diagram illustrating the overall structure of the invention.
Figure 3:
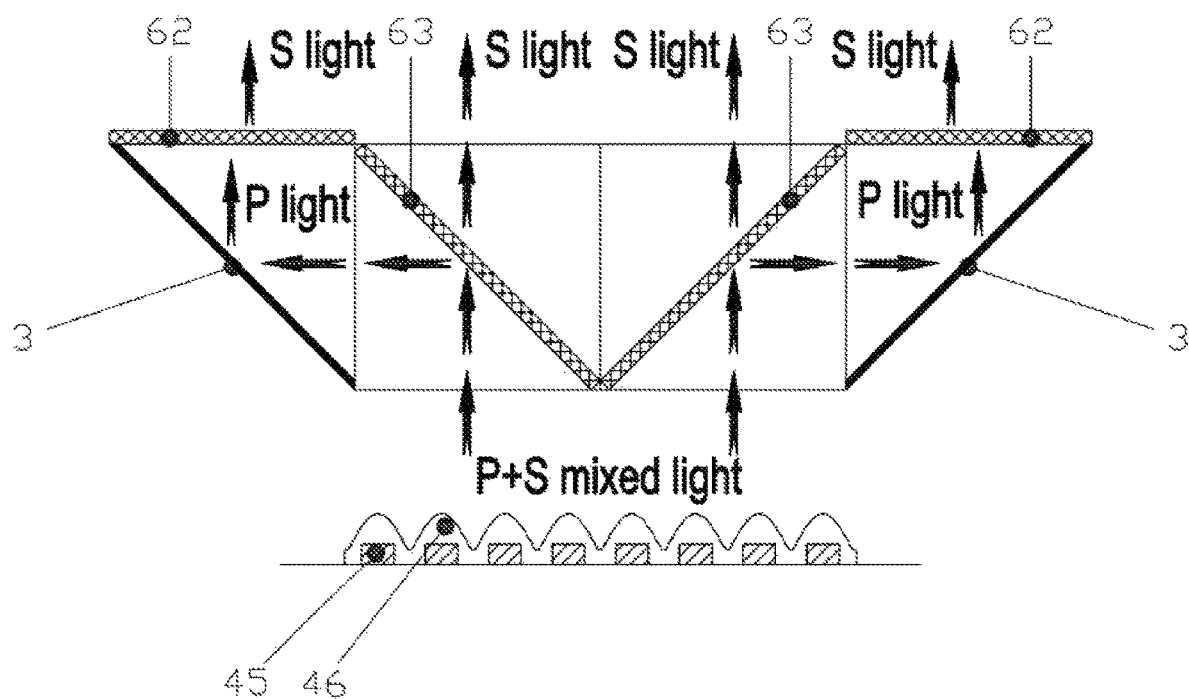
FIG. 3 is the structural diagram illustrating the polarized light conversion prism of the invention.
Figure 4:
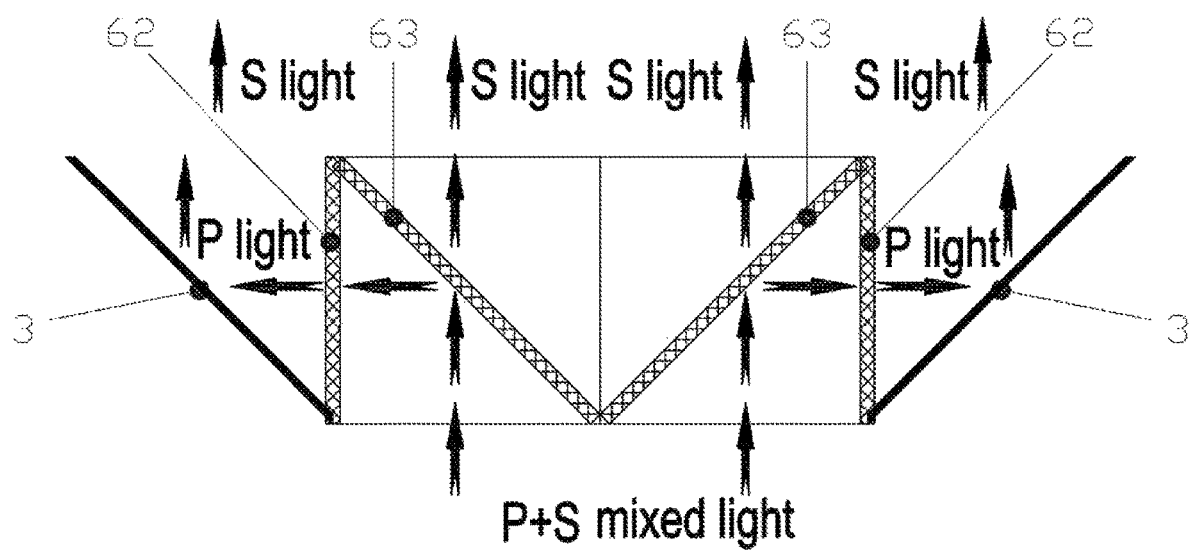
FIG. 4 illustrates the modification 1 of FIG. 3.
Figure 5:
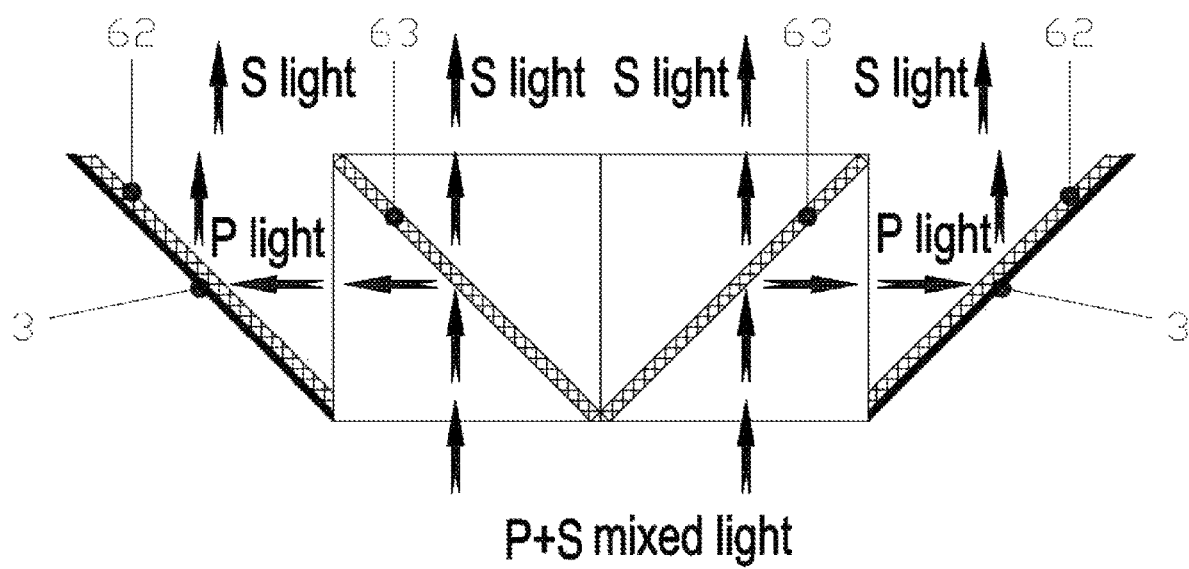
FIG. 5 illustrates the modification 2 of FIG. 3.
Figure 6:
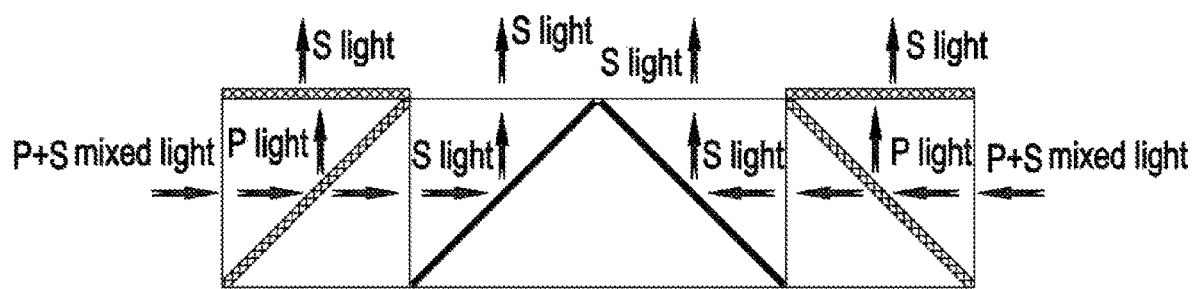
FIG. 6 illustrates the modification 3 of FIG. 3.
Figure 7:
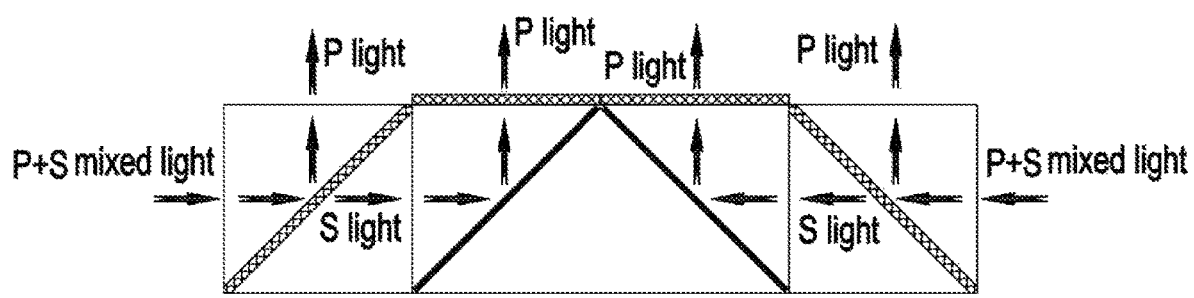
FIG. 7 illustrates the modification 4 of FIG. 3.
Figure 8:
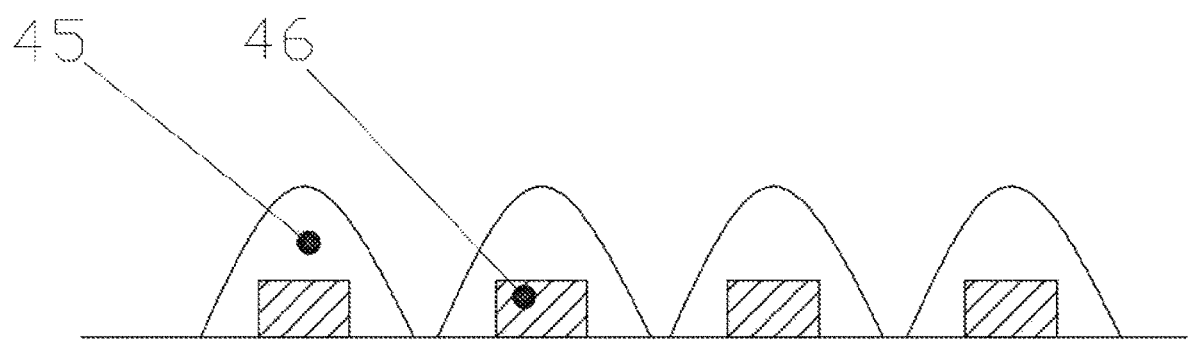
FIG. 8 is the structural principle diagram 1 illustrating the illumination system.
Figure 9:
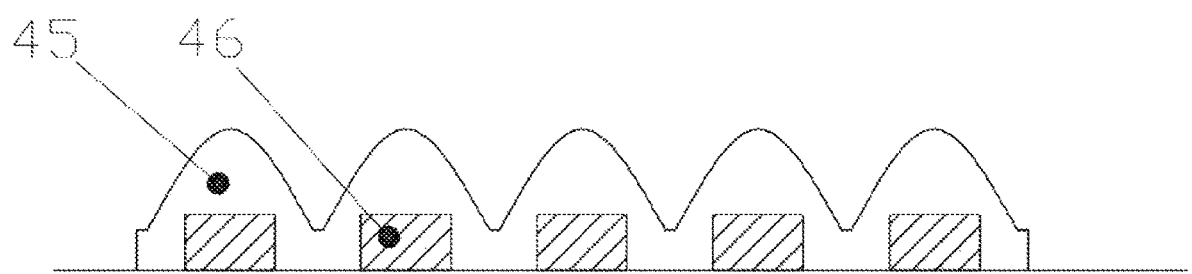
FIG. 9 is the structural principle diagram 2 illustrating the illumination system.
Figure 10:
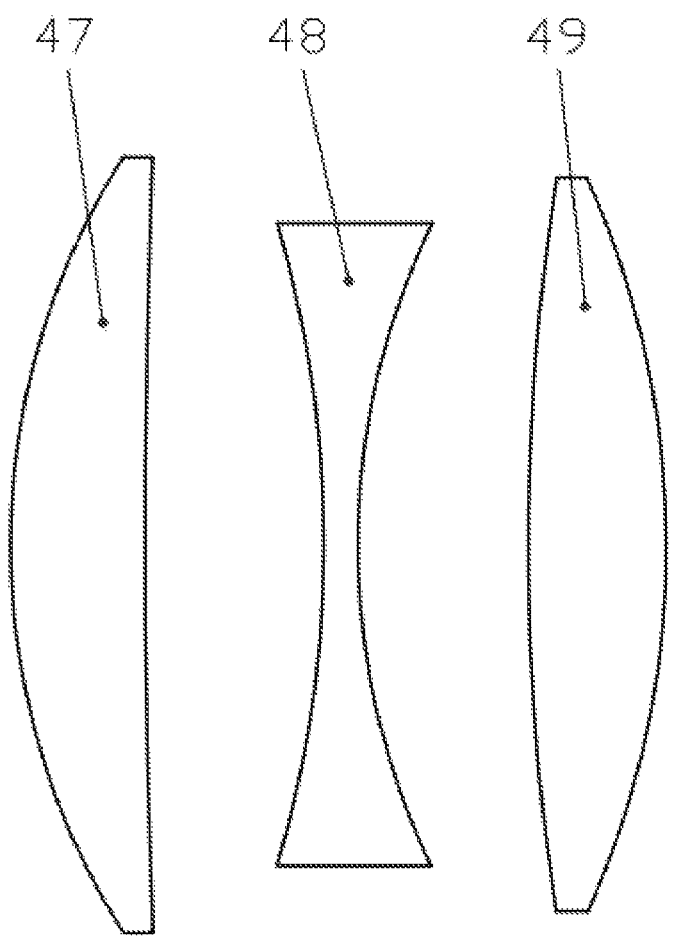
FIG. 10 is the structural diagram illustrating the lens 1.
Figure 11:
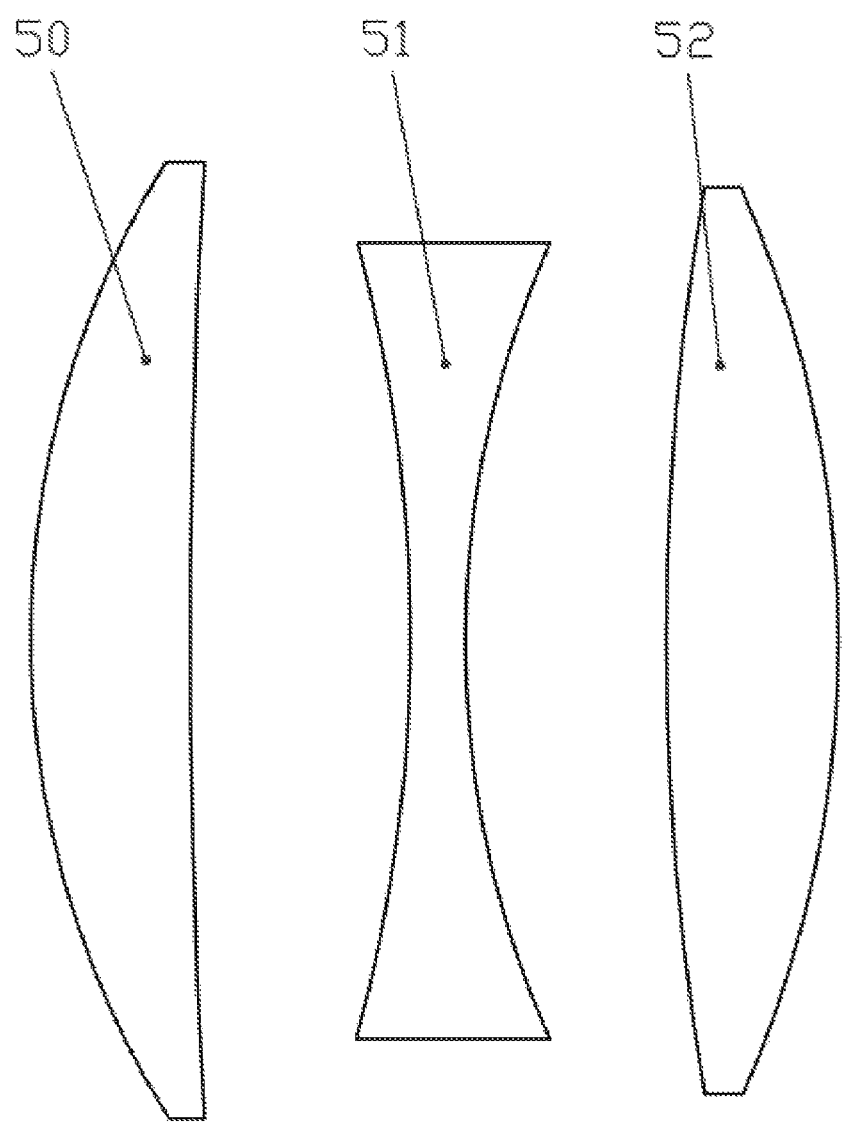
FIG. 11 is the structural diagram illustrating the lens 2.
Figure 12:
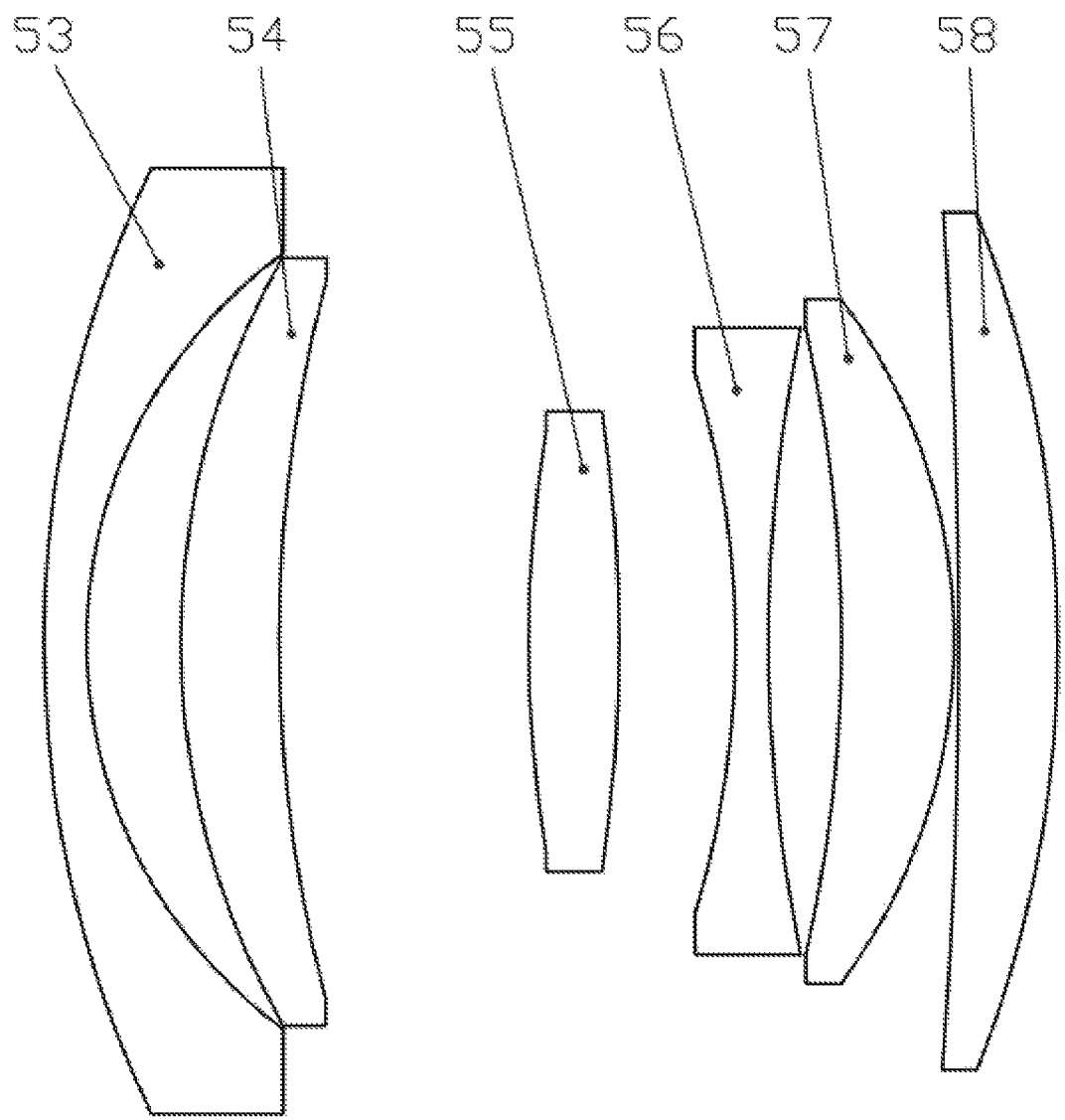
FIG. 12 is the structural diagram illustrating the lens 3.

As shown in FIGS. 1 and 2, the projector comprises a sealed shell 1 of electronic projector, wherein the sealed shell 1 is provided with an optical assembly and an internal circulation cooling assembly inside by area; the optical assembly comprises the projector working assembly and the light source assembly;

the internal circulation cooling assembly is disposed in a first mounting area of the sealed shell 1, and the projector working assembly is disposed in a second mounting area of the sealed shell 1; two mounting areas are distributed in left and right and are electrically connected to each other, and the internal circulation cooling assembly forms a sealed cooling circulation airflow path 22 inside the sealed shell with the projector working assembly.

Among them, the internal circulation cooling assembly comprises a first fan 4, a heat conducting slug 7, a semiconductor refrigeration piece 6, a cooling conducting slug 5 and a second fan 8; the heat conducting slug 7 is mounted on the heat generating surface of the semiconductor refrigeration piece 6, and the first fan 4 is mounted on the side of the heat conducting slug and dissipates the heat generated by the semiconductor refrigeration piece 6; the cooling conducting slug 5 is mounted on the refrigeration surface of the semiconductor refrigeration piece 6, and the second fan 8 is disposed at the cold air output of the cooling conducting slug 5; the cold air generated is blown along the air duct to the optical assembly by the second fan 8; more than one cooling circulation airflow paths 22 are disposed at the air outlet of the second fan 8.

In the embodiment, the projector further comprises a vapor absorption filler 9 and the vapor absorption filler 9 is disposed at one side of the cooling conducting slug to absorb the moisture from the cold air. In the embodiment, the vapor absorption filler adopts the desiccant, which saves cost and has better water absorption effect.

In the embodiment, the outer side of the first fan 4 is provided with more than one air inlet and outlet holes, and the inlet and outlet holes are open to the outside atmosphere.

Among them, the projector working assembly comprises a lens 2, a mirror 3, a front Fresnel lens 10, a LCD screen 11, a heat insulating piece 12 and a rear Fresnel lens 13; the mirror 3 is disposed in an inclined structure at the middle of the entire sealed shell 1; the front Fresnel lens 10 is disposed at the end near the mirror 3, and the outer side of the front Fresnel lens 10 are the LCD screen 11, the heat insulating piece 12 and the rear Fresnel lens 13; the lens 2 is disposed at the bottom of the sealed shell 1 and is against the mirror 3 of the inner side thereof; a cooling circulation airflow path is formed between the front Fresnel lens 10, the LCD screen 11, the heat insulating piece 12 and the rear Fresnel lens 13; the upper and lower portion of the mirror are open to be connected to the second mounting area.

When in use, the invention is inside a sealed shell; the cold air far below normal temperature generated by the circulated semiconductor refrigeration piece takes away the heat on the optical device, which improves the heat dissipation efficiency. Simultaneously, for that the cold air is inside a sealed shell, the optical device can be placed in a dust-free environment, which solves the problem of dirty and black spots for the conventional projector after being used for a period of time.

The cost of the lens is low and the effect is excellent, which solves the problem of balance between cost and effect.

The illumination system comprises an expender lens 14, a polarized light conversion prism 15 and the light source assembly 16, the light source assembly 16 comprises the collimating lens array 45, the LED array 46, the radiator 33 and a third fan 34; the light source is disposed at the input of the polarized light conversion prism 15, and the expender lens 14 is disposed at the output of the polarized light conversion prism 15; the diverging lights emitted from the light source become parallel lights through the collimating lens array; after the parallel lights pass through the polarized light conversion prism, the mixed light of P light and S light emitted from the LED becomes the pure S light; the left of the light conversion prism is provided with a expender lens, and the expender lens diverges the parallel lights after the prism conversion into a beam of taper light; the expender lens is disposed at the outer side of the rear Fresnel lens, and the light-exiting surface thereof is directly opposed to the light-entering surface of the rear Fresnel lens; the light irradiates on the LCD screen after being collimated by the Fresnel lens. The invention converts the useless P light in the conventional projector imagining into the useful S light, which improves the light utilization, and greatly increases the brightness of the projection at the same power.

The polarized light conversion prism 15 comprises the mirror, a half wave piece 62 and a PBS sheet 63, and the half wave piece is disposed at the output of the mirror.

The above description is only a specific embodiment of the invention, but the protection scope of the invention is not limited thereto. Any modifications or alternatives without creative efforts shall fall within the scope of the invention. Therefore, the protection scope of the invention is subject to the protection scope limited in the claims.

What is claimed is:

1. A projector, comprising a sealed shell of electronic projector, an illumination system with PCS function, PCS is polarization conversion system, and a LED light source system with lens collimation, wherein the sealed shell is provided with an optical assembly and an internal circulation cooling assembly inside by an area; the illumination system comprises a prism assembly with PCS function, a beam expansion assembly and a beam collimation assembly; the light source system comprises a collimating lens array, a LED array, a radiator and a fan;

the internal circulation cooling assembly is disposed in a first mounting area of the sealed shell, and a projector working assembly is disposed in a second mounting area of the sealed shell; the first and second mounting areas are distributed in left and right, and the internal circulation cooling assembly forms a sealed cooling circulation airflow path inside the sealed shell with the projector working assembly;

wherein the projector working assembly comprises a lens, a mirror, a front Fresnel lens, a LCD screen, a heat insulating piece and a rear Fresnel lens; the mirror is disposed in an inclined structure at the middle of the entire sealed shell; the front Fresnel lens is disposed at the end near the mirror, and the outer side of the front Fresnel lens are the LCD screen, the heat insulating piece and the rear Fresnel lens; the lens is disposed at the bottom of the sealed shell and is against the mirror of the inner side thereof; a cooling circulation airflow path is formed between the front Fresnel lens, the LCD screen, the heat insulating piece and the rear Fresnel lens; the upper and lower portion of the mirror are open to be connected to the second mounting area;

wherein the illumination system comprises an expander lens and a polarized light conversion prism, the light source assembly comprises the collimating lens array, the LED array, the radiator and a third fan; the light source is disposed at the input of the polarized light conversion prism, and the expander lens is disposed at the output of the polarized light conversion prism; the diverging lights emitted from the light source become parallel lights through the collimating lens array; after the parallel lights pass through the polarized light conversion prism, the light of P light and S light emitted from the LED becomes the pure S light; the left of the light conversion prism is provided with the expander lens, and the expander lens diverges the parallel lights after the prism conversion into a beam of taper light; the expander lens is disposed at the outer side of the rear Fresnel lens, and the light-exiting surface thereof is directly opposed to the light-entering surface of the rear Fresnel lens; the light irradiates on the LCD screen after being collimated by the Fresnel lens.

2. The projector of claim 1, wherein the lens comprises a lens with three structures, and the three lens structures are lens 1 structure, lens 2 structure and lens 3 structure, among them, lens 1 structure:
the radius of curvature of the first piece of glass is 52.6921 mm and −866.592 mm, and the glass material grade is CDGM H-ZK11;
the centre point spacing of the first piece of glass and the second piece of glass is 12.35 mm;
the radius of curvature of the second piece of glass is −91.881 mm and −55.051 mm, and the glass material grade is CDGM H-ZF2;
the centre point spacing of the second piece of glass and the third piece of glass is 12.21 mm;
the radius of curvature of the third piece of glass is 175.873 mm and 64.765 mm, and the glass material grade is CDGM H-ZK11;
lens 2 structure:
the radius of curvature of the first piece of glass is 78.297 mm and −1604.5 mm, and the glass material grade is CDGM H-ZK11;

the centre point spacing of the first piece of glass and the second piece of glass is 23.5 mm;

the radius of curvature of the second piece of glass is −121.834 mm and −79.915 mm, and the glass material grade is CDGM H-F4;

the centre point spacing of the second piece of glass and the third piece of glass is 19.65 mm;

the radius of curvature of the third piece of glass is 296.048 mm and 96.406 mm, and the glass material grade is CDGM H-ZK11;

lens 3 structure:

the radius of curvature of the first piece of glass is 74.71 mm and −32.72 mm, and the glass material grade is CDGM H-K9L;

the centre point spacing of the first piece of glass and the second piece of glass is 6.07 mm;

the radius of curvature of the second piece of glass is 51.997 mm and −103.2 mm, and the glass material grade is CDGM H-ZF2;

the centre point spacing of the second piece of glass and the third piece of glass is 16.6 mm;

the radius of curvature of the third piece of glass is 85.526 mm and 128.03 mm, and the glass material grade is CDGM H-ZK11;

the centre point spacing of the third piece of glass and the fourth piece of glass is 8.05 mm;

the radius of curvature of the fourth piece of glass is −61.557 mm and −111.198 mm, and the glass material grade is CDGM H-ZF2;

the centre point spacing of the fourth piece of glass and the fifth piece of glass is 4.61 mm;

the radius of curvature of the fifth piece of glass is −99.278 mm and 39.529 mm, and the glass material grade is CDGM H-ZK11;

the centre point spacing of the fifth piece of glass and the sixth piece of glass is 0.15 mm;

the radius of curvature of the sixth piece of glass is −467.584 mm and 83.106 mm, and the glass material grade is CDGM H-ZK11.

3. The projector of claim 1, wherein the polarized light conversion prism comprises the mirror, a half wave piece and a PBS sheet, PBS is polarization beam splitter, and the half wave piece is disposed at the output of the mirror.

\* \* \* \* \*